United States Patent
Alsberg

[11] Patent Number: 5,788,152
[45] Date of Patent: Aug. 4, 1998

[54] FLOOR HEATING SYSTEM

[76] Inventor: Terry Wayne W. Alsberg, 702 Sunset Dr., Capitola, Calif. 95010

[21] Appl. No.: 704,729

[22] PCT Filed: Mar. 15, 1995

[86] PCT No.: PCT/US95/03461

§ 371 Date: Dec. 4, 1996

§ 102(e) Date: Dec. 4, 1996

[87] PCT Pub. No.: WO95/25249

PCT Pub. Date: Sep. 21, 1995

[51] Int. Cl.$^6$ .................................................. F24D 5/10
[52] U.S. Cl. .................................................. 237/69; 165/56
[58] Field of Search .................................. 237/69; 165/56, 165/171, 49, 53, 55, 168, 169

[56] References Cited

U.S. PATENT DOCUMENTS

| | | |
|---|---|---|
| 160,014 | 2/1875 | Gedney . |
| 2,681,796 | 6/1954 | Rapp ........................... 257/124 |
| 3,037,746 | 6/1962 | Williams ........................ 257/124 |
| 3,782,132 | 1/1974 | Lohoff ............................. 62/260 |
| 4,121,653 | 10/1978 | Vinz ................................. 165/1 |
| 4,212,348 | 7/1980 | Kobayashi ...................... 165/49 |
| 4,588,125 | 5/1986 | Lutz ................................. 237/69 |
| 4,723,598 | 2/1988 | Yoshio et al. ................. 165/136 |
| 4,782,889 | 11/1988 | Bourne ........................... 165/56 |
| 4,865,120 | 9/1989 | Shiroki .......................... 165/56 |
| 5,022,459 | 6/1991 | Chiles et al. ................. 165/11.1 |
| 5,095,716 | 3/1992 | You ............................ 62/259.1 |
| 5,131,458 | 7/1992 | Bourne et al. ................. 165/56 |
| 5,292,065 | 3/1994 | Fiedrich ......................... 237/69 |
| 5,497,826 | 3/1996 | Ingram ........................... 165/56 |

FOREIGN PATENT DOCUMENTS

| | | |
|---|---|---|
| 27 05 146 A1 | 8/1978 | Germany . |
| 3217578 A1 | 11/1983 | Germany . |
| 3411339 | 10/1985 | Germany . |
| 55-3563 | 1/1980 | Japan . |
| 55-99592 | 7/1980 | Japan . |
| 57-108531 | 7/1982 | Japan . |
| 58-35337 | 3/1983 | Japan . |
| 59-95321 | 6/1984 | Japan . |
| 59-158919 | 9/1984 | Japan . |
| 59-225228 | 12/1984 | Japan . |
| 1-291021 | 11/1989 | Japan . |
| 02082026 | 3/1990 | Japan . |
| 03199827 | 8/1991 | Japan . |

*Primary Examiner*—Henry A. Bennett
*Assistant Examiner*—Derek S. Boles
*Attorney, Agent, or Firm*—Fenwick & West LLP

[57] ABSTRACT

The present invention provides in combination, a radiant panel heating system, configured for ease of installation and maintenance which also provides the structural characteristics required of a subflooring panel within a floor framing system. The system consists of structural subflooring panels (2) with grooves arrayed in a modular geometry. The panels are overlaid with a heat-conducting surface embossed with a matching groove pattern. The panels are capable of being fastened to a variety of floor support structures (1) in a manner typical of subfloor panels, which fulfill a structural requirement only while simultaneously interacting to create an array of approximately evenly spaced grooves into which tubing (4) or wire of the type used in hydronic or electric radiant panel heating is installed.

24 Claims, 4 Drawing Sheets

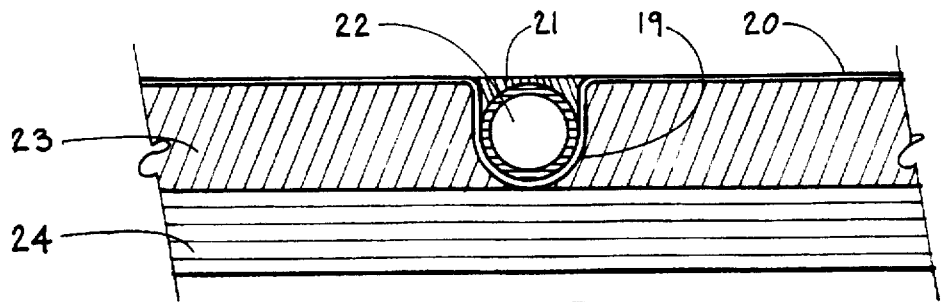
FIG. 5
FIG. 6
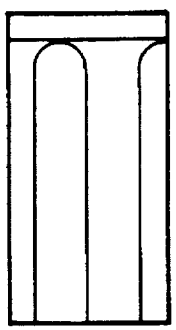 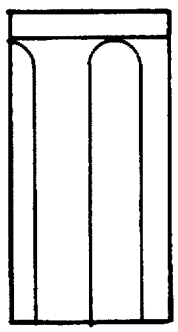 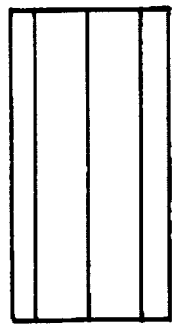 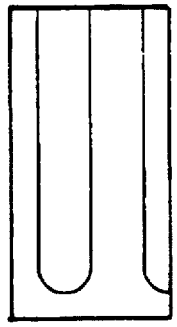 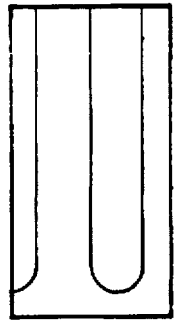
FIG. 7A    FIG. 7B    FIG. 7C    FIG. 7D    FIG. 7E

FLOOR HEATING SYSTEM

BACKGROUND OF THE INVENTION

1. Field of Invention

This invention relates to hydronic or electric radiant panel heating or cooling systems.

2. Description of the Prior Art

Prior art in the concept of heating a space by heating the floor surface within the space goes back as far as the Roman Empire. Hydronic floor panel heating systems currently in use employ metal or plastic tubing embedded in a concrete slab or tubing with aluminum plates attached through various means. There are systems (for example, as distributed by the Wirsbo Company of Apple Valley, Minn.) where, after a floor is constructed, the aluminum plates are attached underneath the plywood subfloor, between the floor joists. There have been systems were the aluminum plates and tubing are supported by light framing (see for example Shiroki, U.S. Pat No. 4,865,120), grooved foam plastic sheets or grooved plywood (for example as distributed by Lagerstedt and Krantz AB of Sweden) placed above the subfloor and covered by an additional sheet of nailable material. There have been some foam plastic systems (for example as distributed by Wirsbo AB of Sweden) and some tile systems (See for example German patent number DE3411339A1 and Williams, U.S. Pat. No. 3,037,746) that utilize modular groove geometry to facilitate the layout of the arrays of tubing.

There have been a number of systems that are comprised of individual panels which contain tubing already embedded in the panels and which are then joined together to create a larger radiant panel array (see for example Rapp, U.S. Pat No. 2,681,796 and Japanese patent numbers 57-108531, 59-158919, 59-95321, 59-225228) which is placed upon a previously constructed subfloor system.

There is no evidence of systems where there is a combination of a structural subfloor panel, with a top surface comprised of a heat conductive sheet embossed with grooves laid out in a modular geometry, which implements the full range of features described herein. It is this unique combination of elements into a system which greatly simplifies the installation of radiant panel heating that distinguishes the present invention from the prior art.

All radiant panel heating systems have tended to provide superior comfort among other benefits and yet current systems have had mixed acceptance in part because of:

(A) Excessive Cost. Prior systems typically involve highly customized designs to fit each building design and as a result are largely site built. They often require additional structural design and cost due to the weight of the panels. Their installation is labor intensive and is accomplished by specialists. These systems disrupt the timing of the construction process and often interfere with the easy installation of finish floor materials.

(B) Reliability. In most current systems the tubing is concealed from the installers of finish floor materials and it is not unusual for a tube to be damaged by a fastener during this process. During a remodel, relocating interior walls also poses a great risk of tubing damage. When tubes are damaged the location of the damage may not be readily detected and the repairs often require substantial dismantling of the floor panels.

(C) Response time. Because of high thermal mass and/or high thermal resistance, current systems are typically slow to respond to changing heating loads with response times measured in hours or days.

OBJECTIVES AND ADVANTAGES

Accordingly the objectives of this invention are to provide for:

(1) A modular geometry, subfloor system, installed using conventional construction methods, timing and skills, which in one step provides a structural subfloor and the basis of a heating system.

(2) Reduced dead weight for a radiant panel heating system which will reduce lateral and vertical loading of a building's structural systems.

(3) A system which allows for and therefore is largely independent of wall placement and application of finish floor materials, is not easily damaged either during the primary construction or any subsequent remodeling phase and which is more readily repaired if damaged.

(4) A reduction in response time to changing heating loads.

(5) In combination with all of the above objectives: a reduction in the cost of materials and labor along with an increase in user satisfaction sufficient to make the overall cost/benefit comparison of radiant panel heating to other heating systems, more favorable.

SUMMARY OF INVENTION

The objectives of this invention are achieved as follows:

In a typical embodiment of the invention, the subflooring membrane of a building is constructed of special sub-floor panels made typically of plywood, oriented strand board or other structurally suitable material which like plywood is easily sawn, nailed, glued and otherwise utilized in a manner consistent with prevalent practices in the construction industry. The sub-floor panels have been manufactured with a pattern of grooves formed into their surface; a heat conductive sheet has been embossed to match the pattern of the grooves; and this sheet has been bonded to the sub-floor panels.

After the panels are in place, an elastomeric compound is placed in the grooves and tubing is pressed into the grooves, following the pattern provided by the modular geometry. The compound holds the tubes in place; fills in any air voids between the tubing and the heat conductive surface and is trowelled flush with the top surface of the panels thereby providing a smooth surface to which finish floor materials are easily attached. The heat conducting surface is in direct contact with the finish floor covering and provides for a more rapid thermal response than conventional systems.

In one step, prior to walls being constructed, the structural subfloor and heating system is installed, thereby providing great cost savings. The clear visibility of the tubing paths makes damage of the tubing while fastening walls and finish flooring materials to this subfloor, unlikely. In the event of damage, leaks are easily located and repairs are easily made.

BRIEF DESCRIPTION OF THE DRAWINGS

The invention will be more fully comprehended from the following detailed description and accompanying drawings in which:

FIG. 5 is a cross section view of the assembled sub-floor panel, heat conductive surface and hydronic tubing.

FIG. 6 is a top view of the grooves in a single modular sub-floor panel which is an aggregate of the geometries depicted in FIGS. 3 & 4.

FIG. 7 is a top view of the grooves in a group of related modular sub-floor panels, which are disaggregated from the geometries of FIGS. 3 & 4.

DETAILED DESCRIPTION

Figure 1:
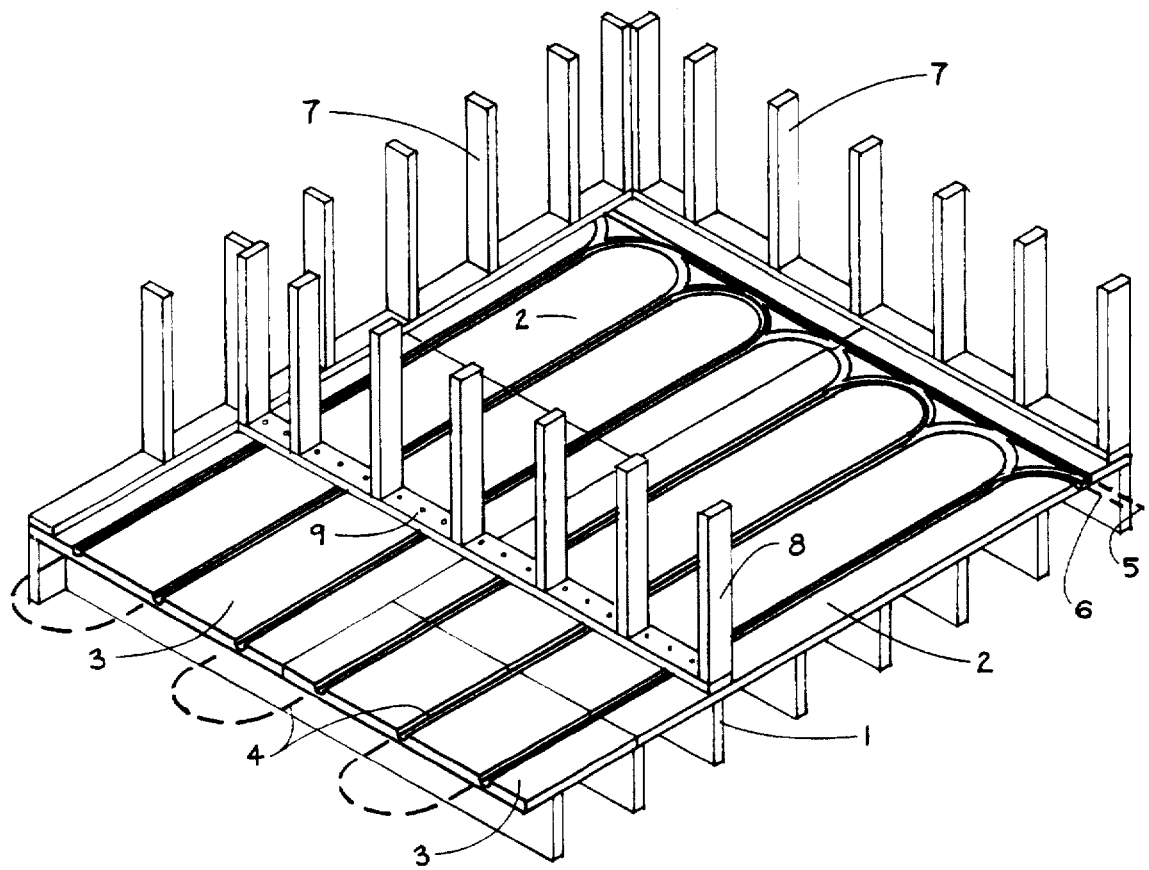
FIG. 1 is an isometric view of this invention utilized within a typical floor framing, subfloor and wall framing system.
Figure 3:
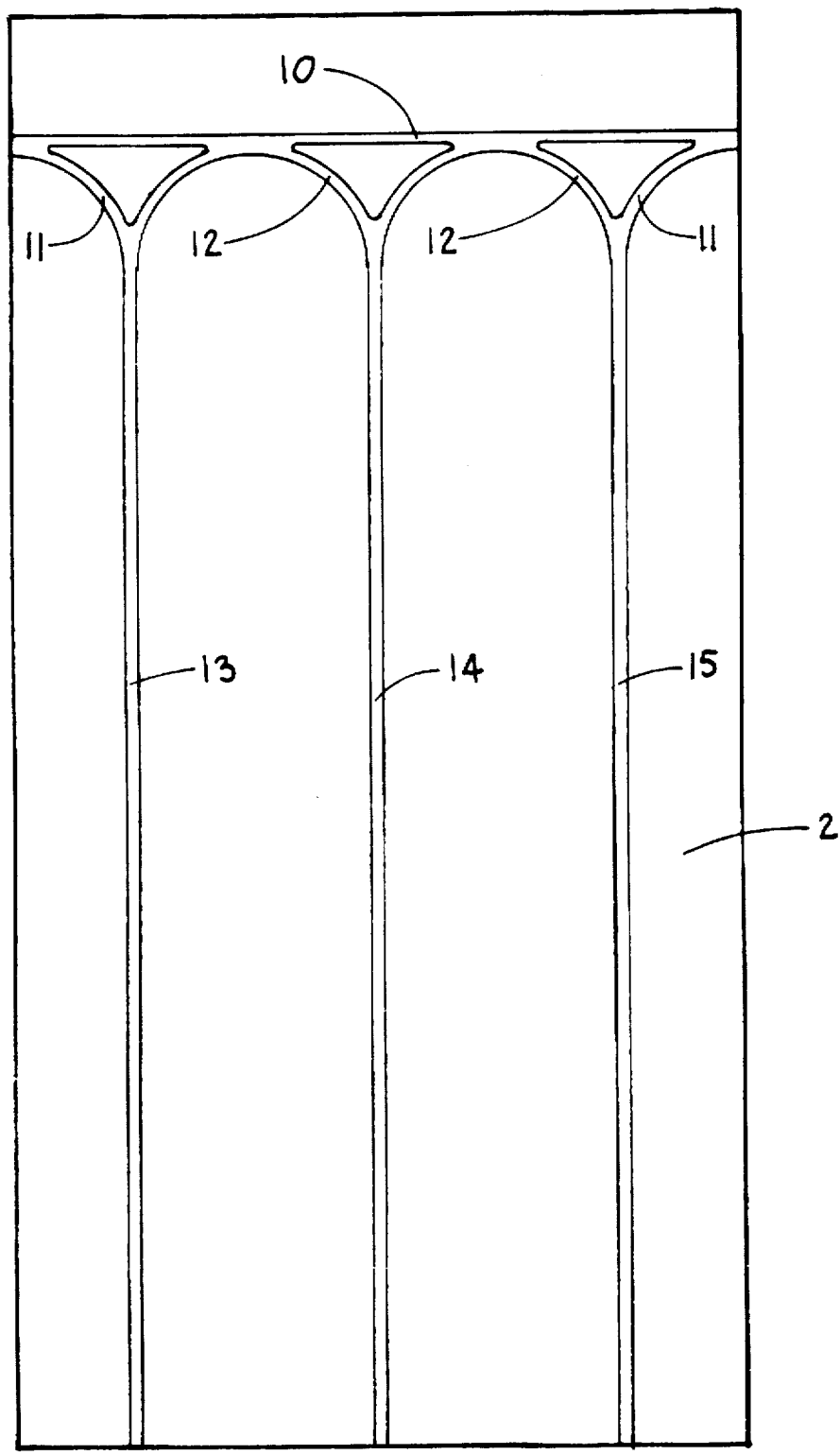
FIG. 3 is a top view of the grooves in a typical modular sub-floor panel used for the end tubing runs.
Figure 4:
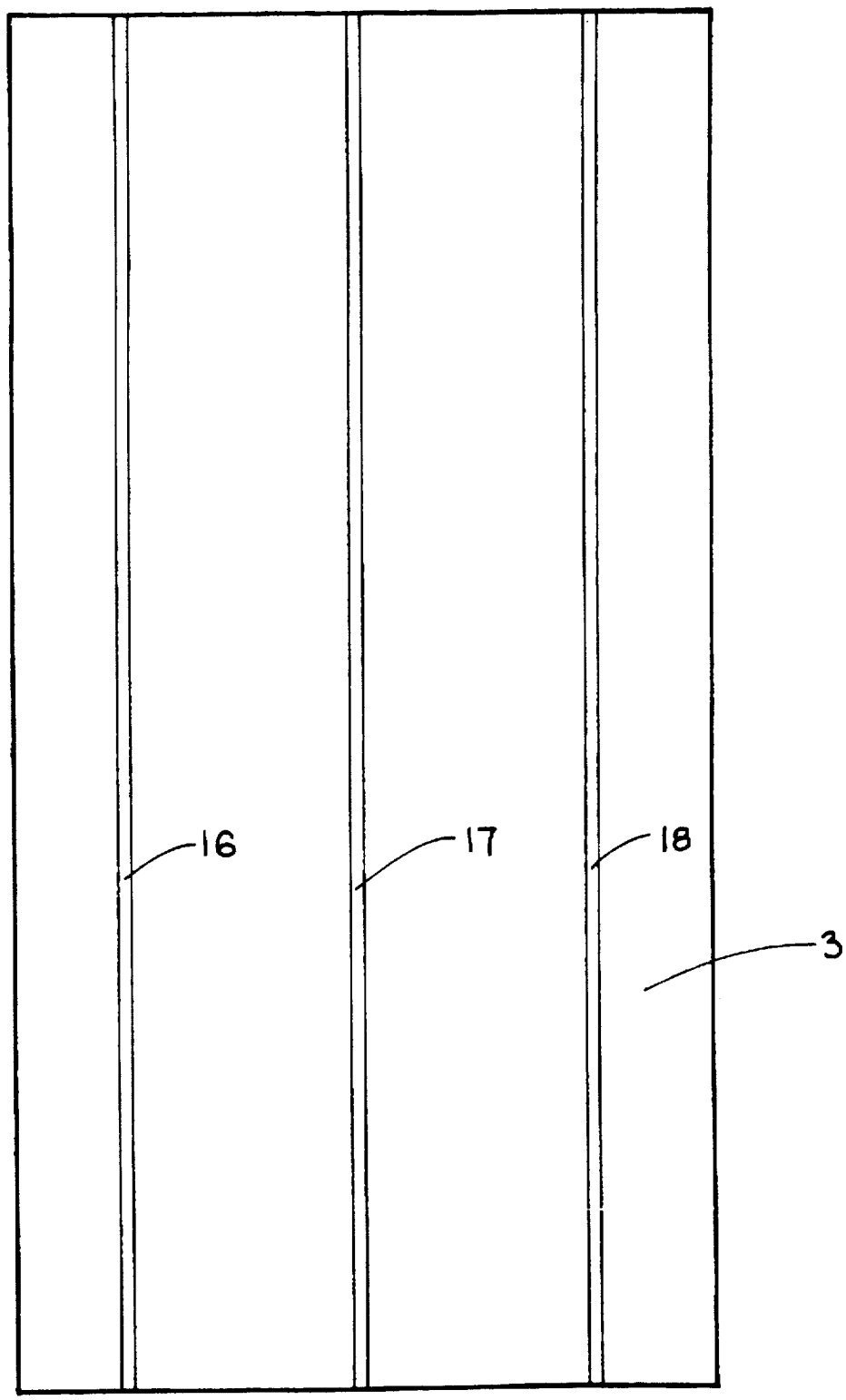
FIG. 4 is a top view of the grooves in a typical modular sub-floor panel used for straight tubing runs.

Referring now to FIG. 1, a typical application of the present invention within a floor framing system is depicted. Conventional floor joists 1 comprise the support system. Panels 2 (such as are depicted in FIG. 3) and 3 (such as are depicted in FIG. 4) are fastened to the floor joists in a manner typical of conventional subflooring membranes. A tube 4 of the type employed in radiant panel heating is pressed into the modular pathway of grooves.

In this example, the inlet is at 5 and the outlet is at 6. The spacing of the grooves allows for exterior walls 7 to be fastened directly to the panels without damaging the tubes. Interior walls 8 can cross the grooves without bearing on and therefore without damaging the tubes. The clear visibility of the tubing paths allows for walls or finish floor materials to be fastened to the subfloor membrane with nails 9, without damage to the tubes.

If repairs become necessary, the same visibility that makes punctures unlikely will make leaks easy to locate. Only that part of the finish floor covering over the defect would have to be removed rather than removing whole sections of the subfloor.

The heat conductive surface is in direct contact with the floor covering such as for example carpet, hardwood floor or tile. The thermal impedance provided by the finish floor covering slows down heat dissipation from the surface sufficiently to reduce the heat gradient between adjacent hydronic tube elements.

In existing hydronic systems the warm up time or thermal lag is governed by the thermal mass and/or resistance of the concrete slab or the plywood subfloor. This can be many hours or even days in existing systems. In the subject invention, low mass plus low resistance permits a change of surface temperature to become measurable in minutes.

Figure 2:
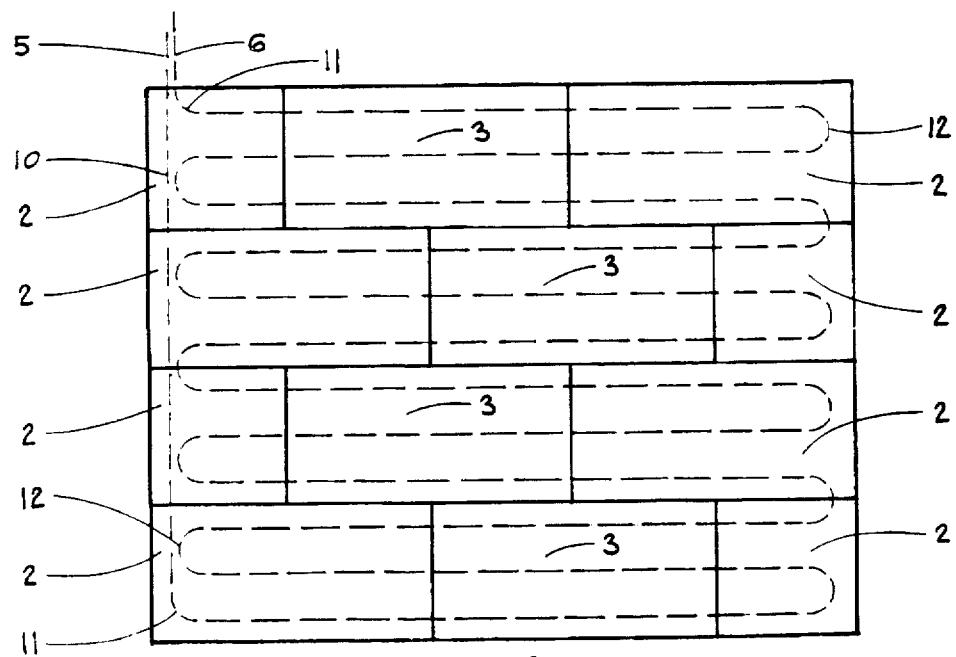
FIG. 2 is a schematic top view of the modular assembly of the heating panels into an array which provides a continuous unjointed tubing path.

FIG. 2 is a top view of a typical array of heating panels which shows an example of how hydronic tubing is placed in an array. The hot water input 5 is routed along the grooves 10 tangential to the arcs of end section panels 2. Then it is routed to a 90 degree curved groove 11. It is then routed as shown in FIG. 2 through end panels 2 turning 180 degrees 12 typically at each end panel, and through straight panels 3 finally turning in a 90 degree groove 11 to the output 6 thereby completing a circuit.

FIG. 3 is a top view of an end section panel utilizing three longitudinal grooves per panel. The size and aspect ratio is typical of subfloor panels currently in use. The spacing between the centers of three grooves 13, 14, 15 is one third of the width of the panel. The centers of grooves 13 and 15 are spaced one sixth of the width of the panel 2 from the long edge of the panel 2. On one end of the panel 2 the ends of grooves 13, 14 and 15 are Terminated by semi circular arc grooves 12. In addition, grooves 13, 15 connect to quarter arc circular grooves 11. Lastly a straight groove 10 is placed tangential and connecting to arcs 11 and 12. The center of this tangential groove is spaced the same distance from the short edge of a panel as grooves 13 and 15 are spaced from long edge.

This spacing, which is based on three primary tubing paths per panel, is optimum for typical construction in the U.S. based on English units of measure. It allows for the erection of exterior walls of conventional thickness while providing sufficient space between the interior surface of an exterior wall and the nearest tubing path for attachment of carpet tack strips. Nonetheless, it may be advantageous to manufacture panels with one, two, four, five or six tube modules per sheet of subfloor, but still in accord generally with the geometry and modularity depicted herein. These units may be selected where, for example, ease of carpet installation is less important than various other considerations such as surface temperature and tubing density. Where metric based lumber and subflooring materials are used, the exact spacing may need to be modified based on the metric sizing of conventional construction materials, but still in accord with the geometry and modularity depicted herein.

FIG. 4 is a top view of a straight section panel utilizing three longitudinal grooves per panel. The spacing between the centers of the three grooves 16, 17, 18 is one third of the width of the panel 3. The centers of grooves 16 and 18 are spaced one sixth of the width of the panel from the long edge of the panel 3. The variations arising from differing numbers of tubing pathways per panel or metric units of measure envisioned in the description of the panels in FIG. 3 apply to these straight run panels as well.

FIG. 5 is a cross section view applicable to all panels depicted herein. A groove 19 is formed in a sub-floor panel. In one embodiment, panels may be manufactured of a homogenous material such as plywood or oriented strand board. In that embodiment, the layer of a panel 23 in which the groove is formed is structurally compromised by the groove and therefore the remaining layer 24 which is ungrooved must have sufficient structural characteristics to span the typical spacing of floor joists 1 found in standard construction. Alternatively, the most cost effective embodiment of this invention may be a hybrid panel with a layer 23 of a material such as chip board or particle board whose primary characteristics are compressive strength and a layer 24 of a material such as plywood or oriented strand board whose characteristics are optimized for structure across a span.

A heat conducting sheet 20 is pre-formed to have a contour matching the sub-floor panel topography and is then bonded to the panel. After installation of the panels in the array of FIGS. 1 & 2, elastomer 21 is placed into groove 19. Then the hydronic tubing 22 is pushed tightly into the bottom of the elastomer lined groove 19 to make good thermal contact with the heat conducting surface 20. Any elastomer 21 not filling voids between the heat conductive surface of groove 19 and the hydronic tubing 22 will be squeezed to the top of the hydronic tubing 22. This excess is then trowelled flush with the top surface of the panel. This provides a flat surface on which floor covering can be installed directly.

The elastomer 21 serves three functions. It improves the heat transfer between the hydronic tubing 5 and the conductive surface 20 by reducing or eliminating air filled voids. It provides a smooth surface and support for pliable floor coverings such as carpet, linoleum or tile. It holds the tubing in place. In the case of a rigid floor covering such as hardwood, a tight press fit between the hydronic tubing 22 and the heat conductive lined groove 19 may permit complete omission of the elastomer 21 and may be the economically most attractive construction method.

The two panel types depicted in FIGS. 3 & 4 are sufficient to produce all of the desired benefits envisioned for this invention with only occasional on site modification. However, in order to allow just two types of panels to accommodate a wide variety of panel layouts, it is obvious that in a given panel there may be arced paths 11 and 12 and tangential paths 10 that are not utilized in a given panel. Eliminating these unused paths by disaggregating the basic geometry of the system into a number of differentiated panels might reduce some of the costs of manufacture and installation with the trade off that more types of panels may be required thereby increasing the tooling and inventory costs associated with this invention. FIGS. 7a, 7b, 7c, 7d, 7e depict an example of a system of panels which is a disaggregation of the geometries of panels 2 and 3.

Alternatively, cost savings due to simplified manufacturing and stocking requirements, may override any need to reduce the number of unused paths and may, to the contrary, dictate that a single panel which aggregates the geometry of the panels depicted in FIGS. 3 & 4 will be most cost effective. FIG. 6 is an example of single panel which is an aggregation of the geometries of panels 2 and 3 into a single panel.

The invention has other potential applications and those skilled in the art can find other fields of use. The present invention may be utilized as a wall panel or ceiling panel which can be easily be made smooth in a manner typical of Gypsum Board surfaces. Instead of heating, the invention could be used for cooling by circulating a cooling liquid. In another example electric panel heating may use a similar modular panel with smaller grooves to receive the smaller diameter wires typical of these systems. Electric cooling could be accomplished by using coulomb cooling. There may be other electronic or thermodynamic applications where standardized modular panels can facilitate the easy assembly of arrays of wires, tubes or fibers as part of a conductive surface.

What is claimed is:

1. A thermal transfer system for a building story comprising,
   a plurality of load-bearing panels, each panel composed of a structural material which can be sawn, nailed, screwed, glued and otherwise utilized in a manner consistent with the requirements for unheated subfloors employed in conventional frame construction, each of the load-bearing panels having a grooved surface to which a heat conducting layer is adhered to form a thermally conductive surface and which substantially conforms to said grooved surface,
   said grooved surface of each of said load bearing panels positioned to abut said grooved surface of an adjacent load bearing panel,
   the plurality of load-bearing panels being positioned together to form a subfloor that is substantially continuous for the story, is secured to support members, and the thermally conductive surfaces of the secured load-bearing panels provide a continuous pathway of grooves substantially throughout the subfloor,
   said grooves opened at a top surface of the subfloor, for incorporating a thermal exchange means to form a substantially continuous, substantially planar, thermally conductive surface over substantially all of the subfloor, prior to and independent of erecting walls or partitions.

2. The thermal transfer system of claim 1, wherein the thermal exchange means is used for heating a room in contact with the thermal transfer system.

3. The thermal transfer system of claim 1, wherein the thermal exchange means comprises tubing for carrying a thermal exchange medium throughout the plurality of load bearing panels.

4. The thermal transfer system of claim 1, wherein the grooves of the load bearing panels are aggregated into a single load bearing panel.

5. The thermal transfer system of claim 1, wherein the hardenable composition has an appearance that is distinct from that of the heat conducting layer to identify locations of the thermal transfer means and reduce damage to the thermal transfer means.

6. The thermal transfer system of claim 1, wherein the plurality of load-bearing panels comprises pluralities of first and second rectangular load-bearing panels, the grooved surface of each of the first rectangular load-bearing panels comprising a plurality of substantially parallel and evenly spaced grooves extending between opposite edges of the first rectangular load-bearing panel and the grooved surface of each of the second rectangular load-bearing panels comprising a first plurality of substantially parallel and evenly spaced grooves extending from a first edge of the second rectangular load-bearing panel and connected through a second plurality of arced grooves near a second edge of the second rectangular panel opposite the first edge.

7. The thermal transfer system of claim 1, wherein said subfloor that is formed from said plurality of load-bearing panels supports point loads, horizontal shear loads, and uniform loads in accordance with conventional wood frame construction requirements and said subfloor replaces a standard subfloor used in conventional wood frame construction.

8. The thermal transfer system of claim 1, wherein said subfloor provides the structural qualities essential to the transfer of the variety of loads borne by a conventional subfloor membrane including said point loads, said horizontal shear loads, and said uniform loads in accordance with conventional wood frame construction requirements and said subfloor replaces a standard subfloor used in conventional wood frame construction.

9. The thermal transfer system of claim 8, wherein s aid load bearing panel can be shaped and fastened to the support members in a manner typical of standard subfloor panels used in conventional wood frame construction.

10. The thermal transfer system of claim 9, wherein a location of said thermal exchange means is visible throughout the top of the subfloor.

11. The thermal transfer system of claim 1, wherein said thermal exchange means is embedded in a hardenable composition.

12. The thermal transfer system of claim 1, wherein the plurality of load-bearing panels further comprises an additional groove extending between edges of each second rectangular panel perpendicular to the first and second edges and tangential to the arced grooves.

13. A thermal transfer system for building a story comprising a plurality of load bearing panels, each of the load bearing panels having a grooved surface to which a heat conducting layer is adhered to form a thermally conductive surface, the plurality of load bearing panels being joined together to form a subfloor for the story in which the thermally conductive surfaces of the joined load-bearing panels provide a substantially continuous pathway of grooves throughout the story for incorporating a thermal exchange means embedded in a hardenable composition to form a substantially planar, thermally conductive surface for the subfloor, prior to erecting walls or partitions;

wherein the thermal exchange means is used for cooling a room in contact with the thermal transfer system.

14. A thermal transfer system for building a story comprising a plurality of load bearing panels, each of the load bearing panels having a grooved surface to which a heat conducting layer is adhered to form a thermally conductive surface, the plurality of load bearing panels being joined together to form a subfloor for the story in which the thermally conductive surfaces of the joined load-bearing panels provide a substantially continuous pathway of grooves throughout the story for incorporating a thermal exchange means embedded in a hardenable composition to form a substantially planar, thermally conductive surface for the subfloor, prior to erecting walls or partitions;

wherein the thermal exchange means comprises insulated wire for ohmic heating or coulombic cooling of a room in contact with the thermal transfer system.

15. A method for constructing a thermal exchange system for a building story of a structure having including support members, from a plurality of load bearing panels, each panel composed of a structural material which can be sawn, nailed, screwed, glued, and otherwise utilized in a manner consistent with the requirements for unheated subfloors employed in conventional frame construction, each of said load-bearing panels having a grooved surface and a thermally conducting panel surface on which is formed a modular grooved pattern that substantially conforms to said grooved surface, the method comprising the steps of:

securing the plurality of load-bearing panels to the support members to form a subfloor that is substantially continuous for the story wherein the modular groove patterns of the plurality of load-bearing panels form a continuous network of grooves substantially throughout a top surface of the subfloor: and depositing a thermal exchange means in the network of grooves after forming said subfloor and prior to and independent of erecting walls or partitions.

16. A thermal exchange system formed by the method of claim 15.

17. The method of claim 15, further comprising the step of:

depositing a hardenable composition in the network of grooves after forming said subfloor and prior to and independent of erecting walls or partitions.

18. The method of claim 17, further comprising the steps of:

smoothing the hardenable composition to form a substantially planar surface with the thermally conducting panel surface; and curing the hardenable composition to form a load-bearing, thermal exchange surface in the subfloor of the story.

19. The method of claim 15, wherein the depositing step comprises the steps of:

depositing a hardenable composition in the network of grooves;

embedding the thermal exchange means in the deposited hardenable composition so that the hardenable composition forms a heat conducting path between the thermal exchange means and the plurality of load bearing panels; and depositing additional hardenable composition over the thermal exchange means.

20. The method of claim 19, wherein the step of depositing a hardenable composition comprises the steps of:

selecting the hardenable composition that is visually distinguishable from the conducting panel surface when cured for identifying the locations of the thermal transfer means; and depositing the selected hardenable composition in the network of grooves.

21. The method of claim 15, wherein said subfloor that is formed from said plurality of load-bearing panels supports point loads horizontal shear loads, and uniform loads in accordance with conventional stood frame construction requirements and said subfloor replaces a standard subfloor used in conventional wood frame construction.

22. The method of claim 21, wherein said subfloor provides the structural qualities essential to the transfer of the variety of loads borne by said unheated single layer subfloor membranes including said point loads said horizontal shear loads and said uniform loads in accordance with conventional wood frame construction requirements and said subfloor replaces a standard subfloor used in conventional wood frame construction.

23. The method of claim 22, wherein said load bearing panel can be shaped and fastened to the support members in a manner typical of standard subfloor panels used in conventional wood frame construction.

24. The method of claim 23, wherein a location of a said thermal exchange means is visible throughout the top of the subfloor.

* * * * *

UNITED STATES PATENT AND TRADEMARK OFFICE
CERTIFICATE OF CORRECTION

PATENT NO. : 5,788,152

DATED : August 4, 1998

INVENTOR(S) : Terry W. Alsberg

It is certified that error appears in the above-identified patent and that said Letters Patent is hereby corrected as shown below:

```
On the title page, item [76]
```
In the Inventor, delete "Terry Wayne W. Alsberg" and insert -- Terry W. Alsberg --.

Signed and Sealed this

First Day of December, 1998

Attest:

BRUCE LEHMAN

*Attesting Officer*   *Commissioner of Patents and Trademarks*